United States Patent
Lowenthal et al.

[19]

[11] Patent Number: 6,035,306
[45] Date of Patent: *Mar. 7, 2000

[54] METHOD FOR IMPROVING PERFORMANCE OF LARGE DATABASES

[75] Inventors: Sheldon Lowenthal, Lexington; Gary E. Sharpe, Cohasset, both of Mass.; Mark W. Farnham, Lebanon, N.H.

[73] Assignee: Terascape Software Inc., Needham, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/977,268

[22] Filed: Nov. 24, 1997

[51] Int. Cl.[7] .................................................. G06F 17/30
[52] U.S. Cl. .............. 707/200; 395/200.31; 395/200.49; 395/200.54; 395/200.68; 395/675; 707/2; 707/3; 707/4; 707/10; 707/104; 707/200; 707/201
[58] Field of Search .................... 707/2, 3, 4, 10, 707/104, 200, 201; 395/200.31, 200.49, 200.54, 200.68, 675

[56] References Cited

U.S. PATENT DOCUMENTS

| | | | |
|---|---|---|---|
| 4,849,879 | 7/1989 | Chinnaswamy et al. | 706/45 |
| 5,086,386 | 2/1992 | Islam | 707/202 |
| 5,245,638 | 9/1993 | Gustafson | 702/186 |
| 5,303,166 | 4/1994 | Amalfitano et al. | 702/186 |
| 5,337,258 | 8/1994 | Dennis | 702/186 |
| 5,347,647 | 9/1994 | Allt et al. | 702/186 |
| 5,544,313 | 8/1996 | Shachnai et al. | 395/200.49 |
| 5,617,567 | 4/1997 | Doktor | 707/2 |
| 5,768,500 | 6/1998 | Agrawal et al. | 395/704 |
| 5,794,229 | 8/1998 | French et al. | 707/2 |

FOREIGN PATENT DOCUMENTS

| | | |
|---|---|---|
| 0 714 063 | 5/1996 | European Pat. Off. . |
| WO 96 17306 | 6/1996 | WIPO . |
| WO 97 17660 | 5/1997 | WIPO . |

OTHER PUBLICATIONS

"OS/2 Database manager Database Event Monitor," IBM Technical Disclosure Bulletin, vol. 34, No. 4A, Sep. 1, 1991, New York, USA. pp. 150–151.

"Table Activity/Reor Indicator for the OS/2 Database Manager," IBM technical Disclosure Bulletin, vol. 34, No. 10A, Mar. 1992, New York, USA, pp. 163–164.

Bennett, Robert "Jovian: A Framework for Optimizing parallel I/O", Proceedings of the 1994 Scalable Parallel Libraries Conference, 1994., Oct. 12–14, 1994, pp. 10–20.

Chen, P. M., "Storage performance–metrics and benchmarks", Proceedings of the IEEE, Aug. 1993, vol. 81, Issue: 8, pp. 1151–1165.

Hall, J. E., "Performance evaluations of a parallel, scalable and expandable database computer", Proceedings of the Twenty–Fourth Annual Hawaii International Conference on System Sciences, 1991., Jan. 8–11, 1991, vol. 1, pp. 85–97.

(List continued on next page.)

*Primary Examiner*—Paul R. Lintz
*Assistant Examiner*—Shahid Alam
*Attorney, Agent, or Firm*—Lee & Hollander

[57] ABSTRACT

The present invention provides a tool with which a DBA can analyze a VLDB at all levels of data storage, both logical and physical, to analyze performance problems. The invention is particularly applicable to systems in which database files are striped over multiple disk drives. In the present invention, storage of information is monitored at three levels: database files, file system files, and individual disk drives Parameters indicating the activity and performance level of each of the levels of storage are taken at selected intervals and stored. An analysis tool is provided that allows a DBA to select a time window during which the database performance is be assessed. The analysis tool has a map of the logical and physical arrangement of the database being monitored and allows a DBA to move from level to level of both logical and physical structures involved in storing the data while displaying I/O activity in an easily understood manner.

14 Claims, 11 Drawing Sheets

OTHER PUBLICATIONS

Hall, J. E., "The Multibackend Database System (MDBS): A Performance Study", International Conference on Databases, Parallel Architectures and Their Applications, PARBASE–90, Mar. 7–9, 1990 pp. 139–143.

Keane, J.A., "Benchmarking Financial Database Queries on a Parallel Machine", Proceedings of the Twenty–Eight Hawaii International Conference on System Sciences, 1995. vol. III, Jan. 3–6, 1995., pp. 402–411.

Seng, Jia–Lang, "Comparing object–oriented database systems benchmark methods", Proceedings of the Thirty–First Hawaii International Conference on System Science, 1998., vol. 6., Jan. 6–9, 1998, pp. 455–463.

Suh, Byung–Hoon, "Development of a benchmark to measure system robustness: experiences and lessons learned", Proceedings of the Third International Symposium on Software Reliability Engineering, 1992, Oct. 7–10, 1992, pp. 237–245.

Thakkar, S.S., "Performance of an OLTP application on Symmetry Multiprocessor system", Proceedings of the 17th Annual International Symposium on Computer Architecture, 1990, May 28–31, 1990, pp. 228–238.

ORACLE FILE SCHEMA STORAGE FORMAT

| FILE NAME | HOST | VOLUME NAME | TABLESPACE NAME | DATABASE NAME | TIME STAMP | USAGE PARAMETERS |
|---|---|---|---|---|---|---|
|  |  |  |  |  |  |  |

FIG. 5

PLEX SCHEMA STORAGE FORMAT

| PLEX NAME | HOST | STRIPESET NAME | VOLUME NAME | USAGE PARAMETERS |
|---|---|---|---|---|
|  |  |  |  |  |

FIG. 6

DISK DRIVES SCHEMA STORAGE FORMAT

| DISK NAME | HOST | STRIPE SET NAME | TIME STAMP | PERFORMANCE SPECS |
|---|---|---|---|---|
|  |  |  |  |  |

FIG. 7

STRIPE SCHEMA STORAGE FORMAT

| DISK NAME | HOST | PLEX NAME | TIME STAMP |
|---|---|---|---|
|  |  |  |  |

FIG. 8

DISK USAGE SAMPLES - DATA STORAGE FORMAT

| DISK ID | TIME | NO. READS | NO. WRITES | KB READ | KB WRITTEN | % BUSY | AVG. QUEUE | % WAIT | SER. TIME |
|---|---|---|---|---|---|---|---|---|---|
| DISK_1 | 1/2/97 9:30 | 2 | 0 | 18 | 0 | 10 | 1 | 0 | 0.8 |
| DISK_2 | 1/2/97 9:30 | 2 | 2 | 16 | 16 | 20 | 1 | 0 | 11.5 |
| DISK_3 | 1/2/97 9:30 | 22 | 22 | 242 | 242 | 42 | 2.3 | 24.8 | 19.5 |

FIG. 9

PLEX USAGE SAMPLES - DATA STORAGE FORMAT

| PLEX ID | TIME | NO. READS | NO. WRITES | KB READ | KB WRITTEN | SER. TIME |
|---|---|---|---|---|---|---|
| PLEX_1 | 1/2/97 9:30 | 0 | 0 | 0 | 0 | 0 |
| PLEX_2 | 1/2/97 9:30 | 6 | 23 | 24 | 165 | 20 |
| PLEX_3 | 1/2/97 9:30 | 33 | 7 | 66 | 14 | 19.4 |

FIG. 10

ORACLE FILE USAGE SAMPLES - DATA STORAGE FORMAT

| FILE ID | TIME | NO. READS | NO. WRITES | KB READ | KB WRITTEN | SER. TIME |
|---|---|---|---|---|---|---|
| FILE_1 | 1/2/97 9:30 | 0 | 0 | 0 | 0 | 0 |
| FILE_2 | 1/2/97 9:30 | 6 | 1 | 0 | 6 | 10 |
| FILE_3 | 1/2/97 9:30 | 20 | 8 | 600 | 135 | 20 |

FIG. 11

| HOST | ITEM MONITORED | START TIME | END TIME | INTERVAL | DAYS |
|---|---|---|---|---|---|
| HOST 1 | DISK ARRAY 1 | 9:00 | 18:00 | 1:00 | M-F |
| HOST 1 | PLEXES | 9:00 | 18:00 | 1:00 | All |
| HOST 2 | ALL | 8:00 | 24:00 | 0:10 | All |

METHOD FOR IMPROVING PERFORMANCE OF LARGE DATABASES

FIELD OF THE INVENTION

This invention is related to database management systems and in particular to systems for optimizing placement of database objects in large database systems having database files stored over multiple disk drives.

BACKGROUND OF THE INVENTION

In the late 1980's, database designers began to borrow parallel processing techniques from scientific supercomputing to meet growing demand for higher performance. Since 1993, database vendors, such as Oracle's parallel server and parallel query initiatives, have enabled this migration by adapting their products to make parallel application implementation easier for users. A parallel architecture is superior to a traditional single processor because the workload is divided into multiple simultaneous processes for faster execution. The same technique is used to speed access to disk storage. When additional capacity or performance is needed, the architecture is scaled by adding additional resources to those already in place, allowing for more parallel processes to occur simultaneously.

Additionally, the cost of hard disk storage has plummeted in the last few years. As a result, database applications requiring very large amounts of storage which would have been prohibitively expensive only a few years ago are now commonplace. A database of 20 gigabytes (GB) of storage would have been considered a very large database (VLDB) in 1993, but now database applications requiring terabytes of storage are becoming commonplace.

Microprocessor power doubles every year or two. Performance of scalable parallel server architectures combining multiple processors is growing even faster. In contrast, while the capacity of disk storage devices has increased greatly, the improvement in hard disk access times has been comparatively small. Disk performance development is constrained by mechanical rotational and seek latencies. Disk drives have moving parts, and mechanical movement takes time. High performance processors have cycle times in nanoseconds while the fastest disk drives have access times measured in thousands of microseconds or more—a factor of six to seven orders of magnitude larger.

Currently the best performance that can be expected of a single disk drive in database application is 50 to 100 access per second. Accessing a single item in a database may require several disk reads, and it is not uncommon to find high performance computing resources idling, waiting for the mechanical components to seek, rotate and find the information requested by a process. Disks involved in one step of a process must often wait for other disks accessing data for another step.

Disk caching is of limited use as a solution to this problem. Caching provides performance advantages where access to stored data can be predicted. In a typical database application, a single transaction may require 50 to 100 disk accesses within a few seconds involving a couple of dozen database objects, such as tables, indexes, logs, etc. These accesses typically retrieve relatively small amounts of data randomly distributed through the database structure. In these types of applications, disk caching provides little or no improvement in the speed of access. Accessing such data serially takes too long for many database applications which require near instantaneous response to a human operator.

Designers of VLDBs have addressed this problem by storing data on multiple drives and by distributing the data across the drives in a manner that reduces the probability that a single drive will need to be repeatedly accessed to retrieve a database object. For example a 23 GB database stored on a single 23 GB drive would be limited to 50 to 100 accesses per second. A typical on-line transaction processing (OLTP) operation would require this performance just to support one operator. By storing the data on 12 smaller 2 GB drives, the effective performance of the database can be increased. For optimally placed data, the improvement in throughput can approach the factor of 12 by which the number of drives was increased.

The process of storing database objects across multiple drives to increase performance is called "striping." Optimal or near-optimal physical placement is important to improving VLDB performance by striping database objects across a large number of drives. Experienced database administrators (DBAs) stripe active database objects to keep related tables, indexes, redo logs, swap files, etc. separated in order to speed up parallel access. This is not much of a challenge for a modest system with few objects and disks, but difficulties expand exponentially as database size grows to 20 GB and larger. As a database gets larger, its components are often haphazardly placed on existing drives, simply being placed where space is available. This leads to hot-spots (over-loaded disks) that are hard to detect and impossible to predict. Worse, in a disk-striped environment, the effect of a single hot-spot can spread to affect many objects, robbing the whole system and all its processes of performance.

Diagnosing these types of problems is not easy. When dozens or hundreds of related database objects must be optimally placed on a large disk array that may include tens or hundreds of drives, the number of possible arrangements of the database objects is huge and visualization of solutions becomes impossible. Because of the large number of possibilities, trial and error methods are inadequate. Frequently, these databases are in use almost all the time, and the access of a DBA to the database for experimentation and analysis may be limited. Accordingly, there is a need for tools which will aid a DBA in analyzing the operation of a active VLDB to enable the DBA to optimize data placement and performance. The present invention provides such a tool.

SUMMARY OF THE INVENTION

The present invention provides a tool with which a DBA can analyze a VLDB at all levels of data storage, both logical and physical, to determine exactly what is causing hotspots. In the present invention, all the significant aspects of storing the database data are monitored. Parameters indicating the activity and performance level of each of the levels of storage are taken at selected intervals and stored. These parameters are already known to the system or are based on readily-available system data, and the sampling process has negligible effect on the database system performance. The data is continuously sampled at the selected intervals so that a profile of the system performance over time is accumulated.

An analysis tool is provided that allows a DBA to select a time window during which the database performance is be assessed. The time window can be continuous, such as May 1–5, or discontinuous such as 9:00 to 10:00 AM on Monday mornings, so that periodic system problems can be isolated for analysis. The analysis tool has a map of the logical and physical arrangement of the database being monitored and allows a DBA to move from level to level of both logical and physical structures involved in storing the data so that the exact source of any disk overloads can be determined. The analysis tool can be used both to diagnose detected performance problems and to check the database periodically to detect potential hotspots before they cause performance problems. Additionally, by using the analysis tool to identify underutilized storage resources, or "cold spots," a DBA can make informed decisions when data placements are changed.

DESCRIPTION OF THE DRAWINGS

The advantages and operation of the present invention are more fully described in the following description of the preferred embodiment and by reference to the drawings, of which:

FIG. 5 shows the storage format in the present invention for Oracle file schema data;

FIG. 6 shows the storage format in the present invention for plex schema data;

FIG. 7 shows the storage format in the present invention for disk drive schema data;

FIG. 8 shows the storage format for stripe schema data;

FIG. 9 shows the format for disk usage sample data in the present invention;

FIG. 10 shows the format plex sample data in the present invention;

FIG. 11 shows the format for Oracle file usage sample data in the present invention;

FIG. 12 shows data stored to define sampling intervals;

FIG. 13 shows the main window of the analysis tool in the present invention and illustrates the various capabilities thereof;

DESCRIPTION OF THE PREFERRED EMBODIMENT

Figure 1:
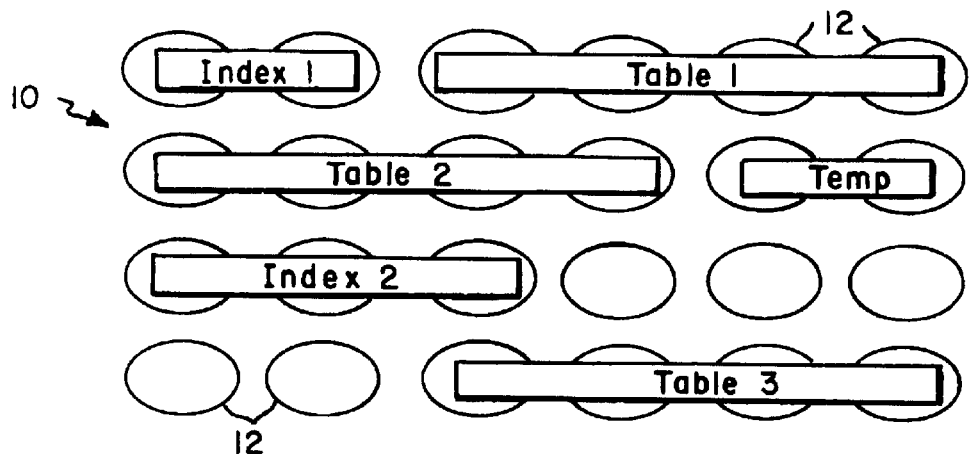
FIGS. 1 through 3 are diagrams showing placement of data in stripes and how such stripes can interfere to cause hot spots.

The following more detailed explanation of how data placement problems arise and affect database performance will be helpful in understanding the operation and advantages of the present invention. In order to set forth examples readily understandable to those skilled in the art, the preferred embodiments of the present invention which are described herein will use an Oracle™ database system. Oracle is a relational database management system (RDBMS) well known to those in the art. It should be appreciated, however, that the present invention may be used with other database systems, and applying the teachings of the present invention to such other databases can be easily accomplished by those skilled in the art after reading the description of the present invention contained herein.

RDBMS architecture requires the storage of multiple data types which will be referred to herein as database objects. For example, Oracle stores user data in tables that are accessed through reference to indexes. Related tables, indexes, and other objects are typically grouped in a tablespace. Transactions are logged in a redo log, so that in the event of a failure the database can be recovered. A number of other types of objects that play a role in maintaining the integrity of the database may also be stored as part of a transaction. An RDBMS typically stores database objects by sending requests to a file management system to store the objects as a database file. When the database object is needed, the RDBMS requests that a particular record or block from a database file be retrieved. A single query from a user may require access to many database files. It is not uncommon for a single user entry to cause 50 to 100 disk accesses to occur, involving a couple of dozen objects (tables, indexes, logs, etc.), solely for the purpose of storing a transaction and securing its integrity.

The process of choosing an arrangement for the various objects of a database and placing or distributing these objects across a number of disks is called placement. The objective of a DBA in doing placement of data is to achieve three goals. First, the access to the database is "parallelized" so that access time performance is kept within predetermined specifications by allowing as many accesses to occur simultaneously as possible. Second, the access to the data should be "load-leveled", so that no one disk is significantly busier than other disks in the array, otherwise, processes that access a busy disk will be slowed. Third, the data must be placed so that access to different objects do not conflict or "pile up," which also will slow down performance. "Optimal placement," is achieved when all three of these objectives are perfectly met and is the goal of DBAs in performing placement.

In real-world VLDBs, optimal placement is a goal which is never fully achieved. As databases grow larger and the number of items that must be placed grow exponentially, the techniques formerly used by DBAs in doing placement have become more inadequate. The present invention provides a unique tool for allowing a DBA to diagnose and analyze placement problems and their solution. The nature of the problem that the present invention addresses and resolves, can be seen in the following examples. It should be appreciated that these examples are highly simplified, and actual VLDB applications are many times more complex and typically include hundreds or thousands of objects, rather than the handful used in the explanations below.

FIG. 1 is a simple example of how a database might be distributed across a number of disks. In FIG. 1, the elements of a 5 GB database are stored on a moderately sized array of 24 individual disks, represented by ovals 12. The various objects making up the simplified database of FIG. 1 include three tables two indexes and a temp file for temporary storage. As shown in FIG. 1, the different objects of the database are all striped over a plurality of disks. A logical storage area that is spread across a plurality of disks is sometimes called a plex, as discussed in more detail below. A group of disks containing one or more intersecting plexes will be referred to as a stripe set. In other words, a stripe set includes a striped plex and all other plexes that intersect it or an intersecting plex.

Nearly always, a number of databases share the resources of an application server. Each of these has its own load and activity profile that may change from hour to hour. Queuing delays can result when two or more heavily loaded objects are mistakenly placed on the same stripset. In the example of FIG. 1, the total available storage capacity is 45 GB, after subtracting that already used by the database shown. While only 10% of the available disk resources have been used, there will typically be other database applications that share the disk resources. These must be placed so as not to degrade performance.

Figure 2:
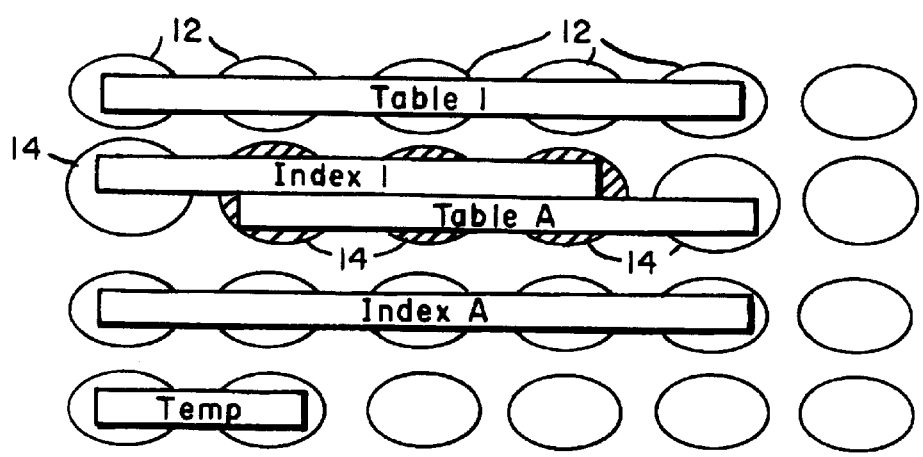
Figure 3:
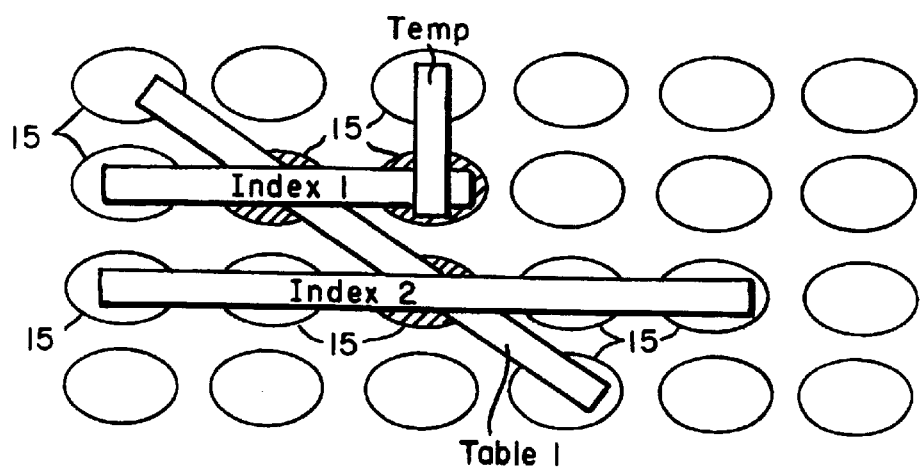

There are many ways in which incorrect data placement can degrade performance. In FIG. 2, Table 1 and Index 1 are objects from a first database and Table A and Index A are objects from a second database. These databases would also include other items not shown in FIG. 2. All of these objects are striped across multiple disks to optimize performance, and while the performance for each database may have been optimized, if Table A and Index 1 are both heavily used, the three disks that the stripes of these objects share will be overloaded, and access requests will queue, generating an activity "hot-spot" and costly delays in servicing a customer request for a record. FIG. 3 shows a somewhat more complicated and realistic situation where several heavily used stripes overlap on isolated single drives to create several hot spots shown by the black drive symbols.

The described embodiment uses the concept of a stripe set. The term "stripe set" as used herein is to be interpreted as including all of the disks that make up a set of stripes which either intersect each other or which intersect another set of intersecting stripes. Thus, stripe sets may include several intersecting striped plexes. Stripe sets, which may include many disks of multiple intersecting stripes, must be distinguished from stripes, which are made up of the disk or disks on which a plex (i.e., a logical disk) is stored.

For example, refer to FIGS. 2 and 3 and assume that no other plexes or stripes are stored other than those shown. In FIG. 2, disks 12, on which Table 1 is stored, would make up one stripe set. In this case, the stripe set includes the same disks as the plex on which Table 1 is stored. In FIG. 2, disks 14 would make up another stripe set. In this case, the stripe set would include the disks of two stripes: the stripe on which Index 1 is stored and the stripe on which Table A is stored. In FIG. 3, all of the disks 15 would form a single stripe set, since the various stripes shown in FIG. 3 are all intersecting.

In actual databases, the situations are vastly more complicated than is shown in FIGS. 1–3. A working VLDB would include hundreds of objects with a very large number of intersections where potential hotspots could arise. While FIGS. 1–3 depict the disk array as an orderly set of orthogonally arranged drives, stripes may be distributed across any of the disks in any order. Thus, in a 50 disk array, one stripe may be on disks 2, 3, and 4 while another may be on disks 2, 5, 34, 35, and 49. With hundreds of objects spread across stripes that are essentially arbitrary in arrangement, it is virtually impossible for a DBA to visualize the system while attempting to track down and eliminate hot spots.

To add further to the problem, the patterns of accessing the database are dynamic, changing constantly with time. It is not unusual to encounter situations where system performance is degraded only at certain times of the day, week, or month, in response to database queries which only occur periodically. For example, payroll records may only be heavily used weekly or monthly.

Figure 4:
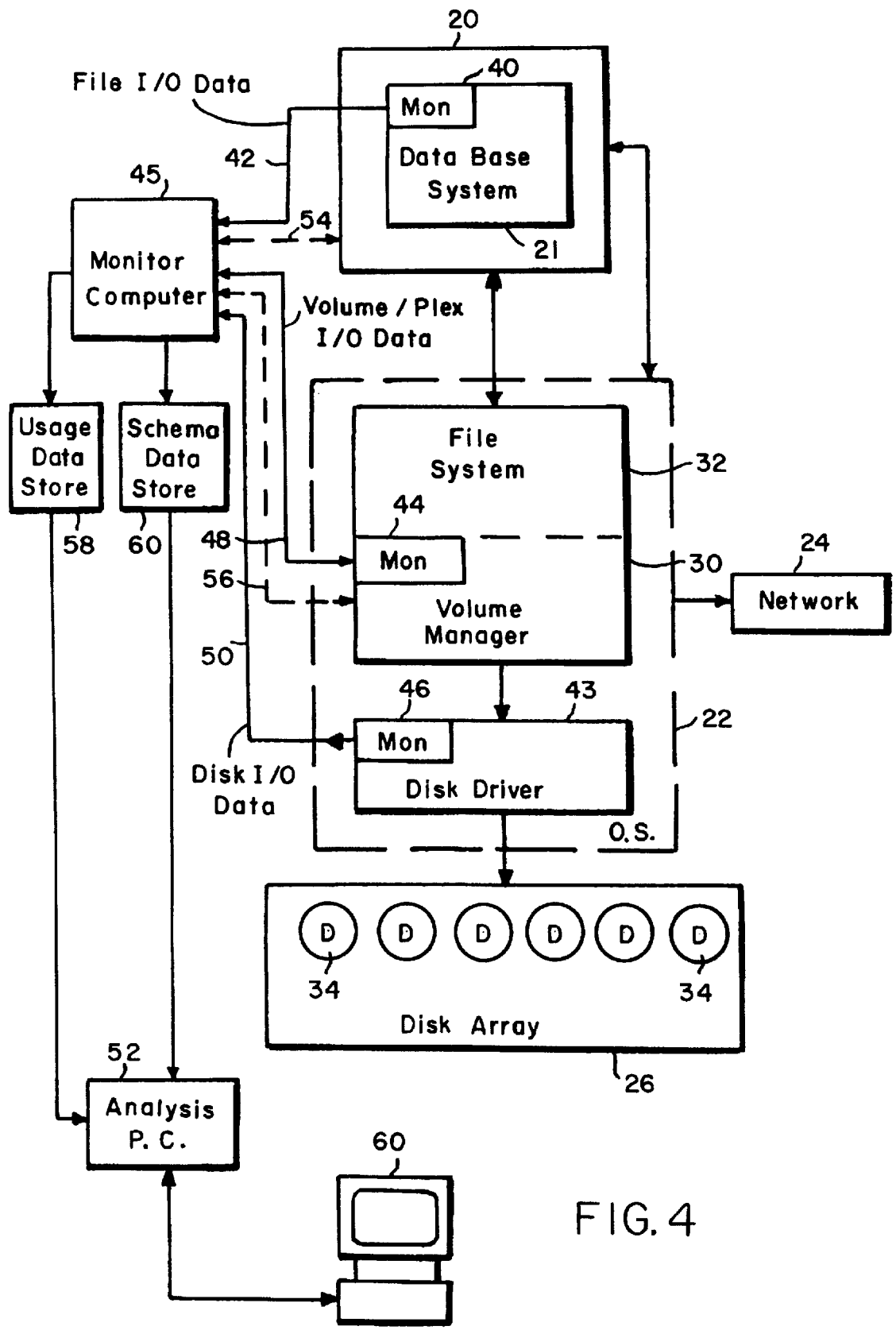
FIG. 4 is a block diagram showing the components of a database system and their interaction with the present invention.

FIG. 4 is a block diagram of an exemplary Oracle VLDB system. The system includes a host or server computer 20 on which the Oracle database application program 21 runs. The server 20 also includes operating system software 22, such as Unix or Windows NT. The operating system includes a file system 32 which responds to requests from the Oracle database to save and retrieve database files, and also disk driver routines 45 which actually control the sending and retrieval of data to individual disks. In the described embodiment, a volume manger 30, such a Veritas, is also included, as discussed in more detail below. Typically, the operating system 22 includes provision for connecting via a network 24 to a plurality of terminals or other devices by which people can enter data into and retrieve data from the Oracle system.

Data is stored on a disk drive array 26. Array 26 will have a large number of individual disk drives 34, the exact number being selected to provide adequate storage space and to provide the access speed required for the particular application. A VLDB with 200 GB of data might use a disk array with 20 to 50 disks. The disk drive array typically includes a controller which responds to commands from the file system 32 to store data on individual disks 34, although sometimes the disks are directly controlled by the computer 20. In some applications, the individual disks may actually be virtual disks, implemented by a plurality of disks and a dedicated controller. A RAID disk array would be an example of such a virtual disk drive.

During operation, the Oracle server stores data and makes requests for retrieval of data to the file system 32. The file system is usually a part of the operating system 22 and includes a file system manager. A VLDB needs to store data of various types including, for example, tables of data, indexes, relations, and other items. Depending on the particular implementation of a VLDB other items will be included in the list of items to be stored. These items will be collectively referred to as database objects in this description of the preferred embodiment.

In Oracle systems, database objects are all stored as Oracle files, regardless of the type of the object. Oracle files are each associated with a tablespace, which can contain one or more Oracle files. Files can be assigned a particular storage location, and so the placement of Oracle tablespaces is determined by the placement of the associated file. The placement of files is determined by the DBA during the initial design and setup of an Oracle database, and file placement can be changed after the initial database setup.

In response to requests from the Oracle server to store or retrieve data. the file system or volume manager will send the appropriate commands and data to disk array 26. In the described embodiment, data is stored in volumes. A volume is a virtual or logical disk, and may include a single disk or may include several disks across which stored database files are striped. The placement of a volume is determined by the DBA during initial setup. A database file is always stored in a single volume, and a volume may contain one or many files.

Typically, in systems that include a volume manager, the mechanics of storing data assigned to a particular volume in the multiple disks that store the volume set are taken care of by the volume manager 30. The volume manager is operating system level software that manages the striping and mirroring of data and plexes. (Some VLDB systems do not include a volume manager, and the sending of data to the disk driver routines 43 would be carried out by the operating system's file system 32 instead of by a volume manager.) Thus, in response to a request from the Oracle database program 21 to store or retrieve a particular database file, the file system 32 and volume manager 30 will send commands and data to the disk array 26 to store the data on the proper disk or disks.

Additionally, the volume manager 30 may implement redundant data storage. For example, the Veritas volume manager frequently used in Oracle systems may be set up to automatically mirror selected volumes on the disk array. Data mirroring can be used for protection from disk or hardware failure, and also to allow faster access to heavily used data.

Thus, although data is stored in volumes by the volume manager, there may be more than one location where data in a volume is stored. Each of these individual copies of the data will be referred to herein as a plex. For example, data stored in a volume called VOL1 which is mirrored by the volume manager would be stored in two different plexes, VOL1-P1 and VOL1-P2, which would normally be located on different individual disks or sets of disks in the disk array. Each plex that makes up a volume is normally structured the same way in terms of disk usage. Thus if the plex VOL1-P1 were striped across five individual disks, its mirror VOL1-P2 would likewise be striped across five different disks. Volumes that are not mirrored consist of a single plex. It should be understood that references to volumes or plexes refers to logical disk structures which may include a single disk or multiple disks across which files are striped.

Data is periodically taken at preset intervals to collect information that shows the statistics of data storage on three different levels. Statistics are kept for Oracle database file I/O requests, for plex I/O operations, and for individual disk I/O operations. This data is stored in its own database, typically on a platform which is independent of the Oracle server and disk array.

In FIG. 4, the Oracle server includes a monitor routine 40 which periodically samples and sends data about Oracle file performance which is stored for later analysis. This monitor routine include information on when samples are to be taken, and it gathers statistical data on Oracle file I/O operations that are readily available from the Oracle program. In the embodiment shown in FIG. 4, this data is sent over a channel 42 to a separate computer 45, but it should be understood that other arrangements may also be used. For example, some or all of the functions of the monitor computer 44 could be performed on the machine hosting the Oracle server 20.

Similarly the volume manager 30 and the disk driver routines 43 have their own monitor routines 44 and 46 which collect and send performance data for storage, as described more fully below. Depending on the configuration and products used in a particular situation, the monitor routines may query the volume manager and the disk driver routines for the needed data, or they may have to be written to gather these statistics themselves, if the needed data is not provided by the volume manager and disk drivers. For example, Veritas has a statistics function that will return this data for plex operations, while the IBM volume manager does not and needs a specialized monitor routine. These monitor routines 40, 44, and 46 are straightforward and may be easily written by one knowledgeable in the art. It should also be appreciated that the present invention may be used with configurations other than that shown in FIG. 4. For example, a system may not include a volume manager, in which case the monitor routine 44 which collects data on logical disk accesses would monitor the file system 32, or the disk driver routines may be part of the disk array software, rather than in the operating system, in which case the monitor routine 46 which collects data on individual disk accesses would monitor the driver routines in the disk array software.

Prior to beginning the monitoring operations that periodically sample the database system performance, the DBA must set up a schedule which determines when samples are taken. In the described embodiment, the scheduling data includes the data shown in the table in FIG. 12. Items to be monitored may include database files, volumes or plexes, and individual disks. The scheduling data includes fields to identify the host (server), the item on the host to which the scheduling data applies, starting and ending times for taking samples, the interval between samples, and data identifying which days samples are to be taken. A host field is included because typically, the present invention would be used in situations having multiple databases from multiple servers, although the embodiment described herein only shows one database for simplicity. Different sampling times may be set for the same item. For example, accounting related items might be sampled more frequently during the end of payroll periods when usage is heavier. A schedule might identify all database files for sampling once an hour and additionally identify accounting related files for sampling every ten minutes during the last five days of each month when accounting activity is high.

The system also includes a store 60 for schema data, which represents the relationships between the monitored items, including database files, logical disks such as plexes or volumes, and individual disk drives. The schema store 60 also includes relationships between other database structures of interest, such as tablespaces and stripe sets. FIGS. 5–8 show the schema data which would be stored for the described embodiment.

FIG. 5 shows schema data that would be stored for each database file. This data includes the Oracle file name, the host name, the volume name on which the file is stored, the Oracle tablespace which contains the file, the database name with which the file is associated, a time stamp and usage parameters.

FIG. 6 shows plex schema data that would be stored. This data includes the plex name, the host name, the name of the stripe set of which the plex is a part, the name of the volume associated with the plex, a time stamp, and usage parameters.

FIG. 7 shows schema data that would be stored for each of the disk drives, including the disk name, the host name, the associated stripe set name, a time stamp, and performance specifications.

The specifications and usage parameters for Oracle files, plexes, and disk drives are used for normalizing data before display, as discussed in more detail below.

FIG. 8 shows schema data that would be stored to identify each of the disks which make up a stripe on which a plex is stored. This data includes a record with the disk name and plex name for each disk making up a stripe, along with an identification of the host and a time stamp. The stripe schema data in FIG. 8 is different from the stripe set data stored in the records of FIGS. 6 and 7. The stripes identified in FIG. 8 are the stripes, stored on one or more disks, on which a single plex is stored.

The time stamp data in FIGS. 6–8 indicates the beginning time at which the schema data is valid. The relationships between plexes, stripe sets, disk drives, and other database structures may change over time as placement is changed. Accordingly, it is important to indicate the time at which the schema data is valid, otherwise the sample data that is collected and stored may be incorrectly interpreted.

The schema usage specs in FIGS. 5–8 include usage and performance specs. In the described embodiment, the usage specs for Oracle files and plexes reflect the DBA's estimate of the expected load for the different items, such as number of reads and writes, etc. The performance specs for the disk drives include seek parameters, disk RPM, and other performance data. These parameters are used to normalize the data from collected samples before it is displayed, as described more fully below.

The monitor computer 45 has communication channels with the Oracle server 20 and with the file system manager 32, denoted by dashed lines 54 and 56. It sends sampling schedule data over these channels to each of the monitoring routines and receives updates to the schema relationships over these channels when the schema is changed.

At the selected times and intervals, the monitor routines for the Oracle database, the volume manager, and the disk drivers collect a number of different performance statistics and send that data to the monitor computer 45 for storage in the usage data store 58. These measurements provide a series of snapshots of the system performance which are used by the analysis tool described below to diagnose system problems. In the described embodiment, data is gathered over three sample measurement periods that are about fifteen seconds long. It should be appreciated that the measurement period may be varied, depending on the particular application involved.

Several different types of data are collected for the disk drive, plex, and database file usage samples. These data types will be referred to a properties below. The properties collected include the following: number of reads per second; number of writes per second; number of kilobytes read per second; number of kilobytes written per second; queue length, which is the average number of I/O requests pending for a disk drive during the measurement period; service time, which is the average time in milliseconds for an I/O request to be completed; percent busy, which represents the average utilization factor for a disk during the measurement period; and percent wait, which is the average percentage of time that there are transactions waiting for service during the measurement period.

FIG. 9 shows the format for the data taken and stored for the disk performance samples, along with exemplary data. The data stored for each sample includes the disk name (or other disk identifier) and the time of the sample. These two fields uniquely identify each of the disk data samples. For each sample all of the properties listed above are stored, including: the total number of read operations performed by the disk over the last second; the total number of write operation performed; the number of kilobytes (kB) read; the total number of kB written; the percentage of time the disk was busy; the average queue size for the disk; the wait percentage for the disk; and the average service time in milliseconds.

FIG. 10 shows the format for the data taken and stored for the plex performance samples, along with exemplary data. These samples are identified by fields with the plex name and the time of the sample. The properties stored for each plex sample include the number of reads; the number of writes; kB read; kB written; and service time.

FIG. 11 shows the format for the data taken and stored for the Oracle file performance samples, along with exemplary data. Each sample is identified by fields with the file name and sample time. The properties stored for each file sample include: number of reads; number of writes; kB read; kB written; and service time.

The monitor routines 40, 44, and 46 send data reflecting the actual operations performed at each of the three levels monitored. In many, if not most, cases, not all database files, plexes and disks being monitored will have activity during each measurement period. The storage routines running in monitor computer 45, or its equivalent, which store data in the usage data store 58 keeps track of all items being monitored. Monitors 40, 44 and 46 create and add usage records with zero values for each of the properties for each item being monitored which has no activity during a measurement period. In this manner, the three data tables shown in FIGS. 9–11 will include for each sample time stamp, a complete list of records reflecting every item being monitored, even those zero values for those items—disks, plexes, and database files—which had no activity during the measurement period.

The usage and schema data stores are the sources for data used to generate the displays that the analysis tool provides. In the described embodiment, the analysis software runs on an independent computer, such as an IBM compatible personal computer running an operating system such as Windows 95 or Windows NT. FIG. 13 shows a typical screen that would be presented to the user to initiate an analysis session.

Referring to FIG. 13, a DBA would first choose a particular Oracle host or server, as shown in box 70. Next, the user selects the time period to be analyzed by filling in the data in the boxes in a window such as that shown in FIG. 13 as window 78. This determines which samples stored in the sample data store 58 will be used for the analysis. A user can select a long period of time to spot general trends in system usage and performance. Alternatively a very small interval can be selected if the cause of a particular problem is to be analyzed. Typically, the interval window will include shortcuts for selecting particular periods of interest, such as weekdays. When a period has been chosen, the data is entered by activating button 77.

The DBA then selects the first item to be viewed in the I/O type menu 72. In the described embodiment, I/O type menu 72 includes tablespaces, files, volumes, plexes, stripe sets, and disks, as shown by the drop down menu 72. Sample data from the monitor routines 40, 44, and 46 are available directly from the usage data store 58, as described above in connection with FIGS. 9–11. Data for stripesets, volumes, and tablespaces are calculated by adding together the statistics for the associated disks, plexes, and database files, respectively, when one of these items is selected.

Next the user selects the desired property to be displayed from the drop down menu 74. The available properties will vary, depending on the particular item selected in I/O type menu 72. The available properties for disks, plexes, and Oracle files are as shown in FIGS. 9 through 11. The properties available for tablespaces, volumes, and stripe sets are the same as for files, plexes, and disks respectively, and they are calculated as described above.

An additional property called weighted I/O is also available for all of the items. Weighted I/O allows a user to select two or more of the available properties for an item and to combine them in whatever proportions the user desires. For example, a user might choose to select to give equal or 25% weighting to four properties such as number of reads and writes and number of kB read and written.

Different properties will be chosen by a user, depending on the particular use of the database being analyzed. Different applications impose much different I/O load profiles on a VLDB storage system. For example, an OLTP application is transaction oriented, and the data blocks are typically short. In OLTP, the number of reads and writes is typically more representative of system performance than the total number of kilobytes read and written. Since OLTP response time is so important, service time, percent busy, and percent wait are also important variables. On the other hand, data warehouse application places a premium on kilobytes read, since this type of VLDB application tends to emphasize read operations during extended query operations. In the described embodiment, the analysis offers several different mathematical methods of combining the samples, including average, minimum, peak, median and RMS, chosen in menu 76.

After the server, property, statistical type, item to be displayed, and time period have been selected, the user initiates an analysis by activating the "calculate" screen button 80.

Figure 14:
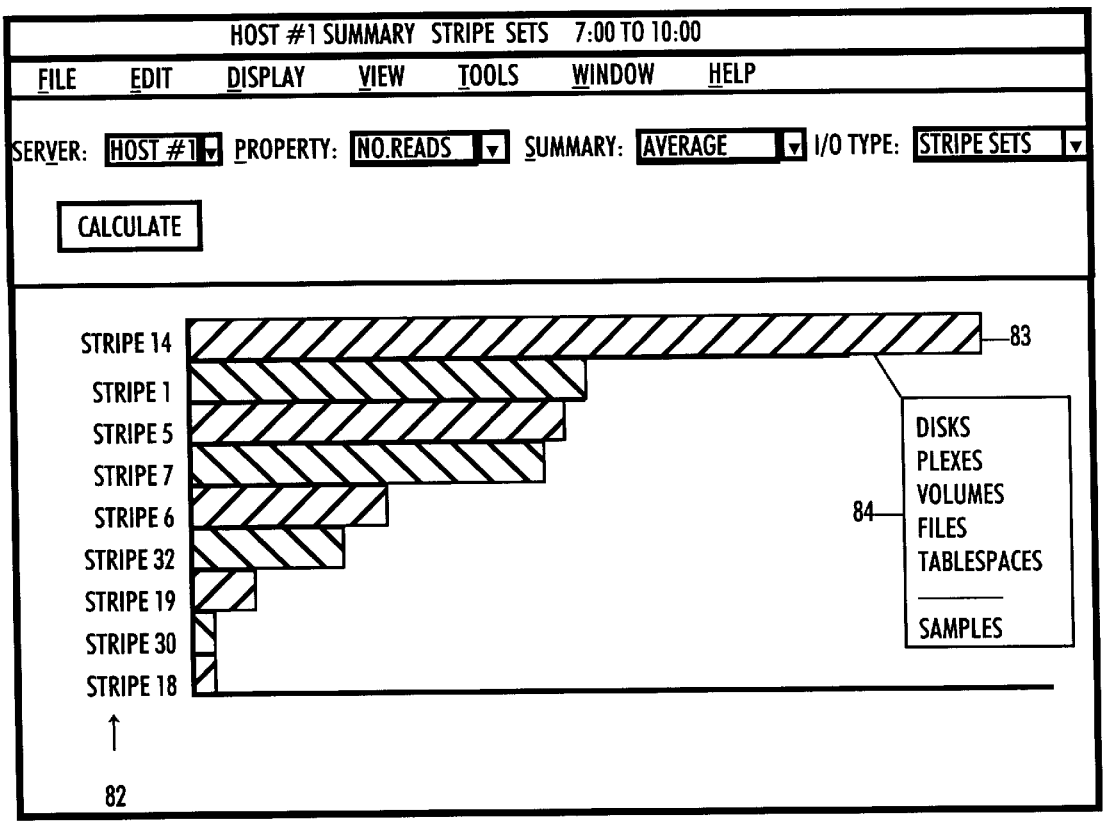
FIG. 14 show how a representative display showing stripe set activity for a database.

FIG. 14 shows the results of an analysis that requested the number-of-reads property for the stripe sets of a database using the average value of the samples selected. In the described embodiment, the data is displayed as a bar graph with the stripe sets arranged in descending order of usage, as shown in FIG. 14. The identity of each stripe set is given in column 82 to the left of the corresponding bar.

Figure 20A:
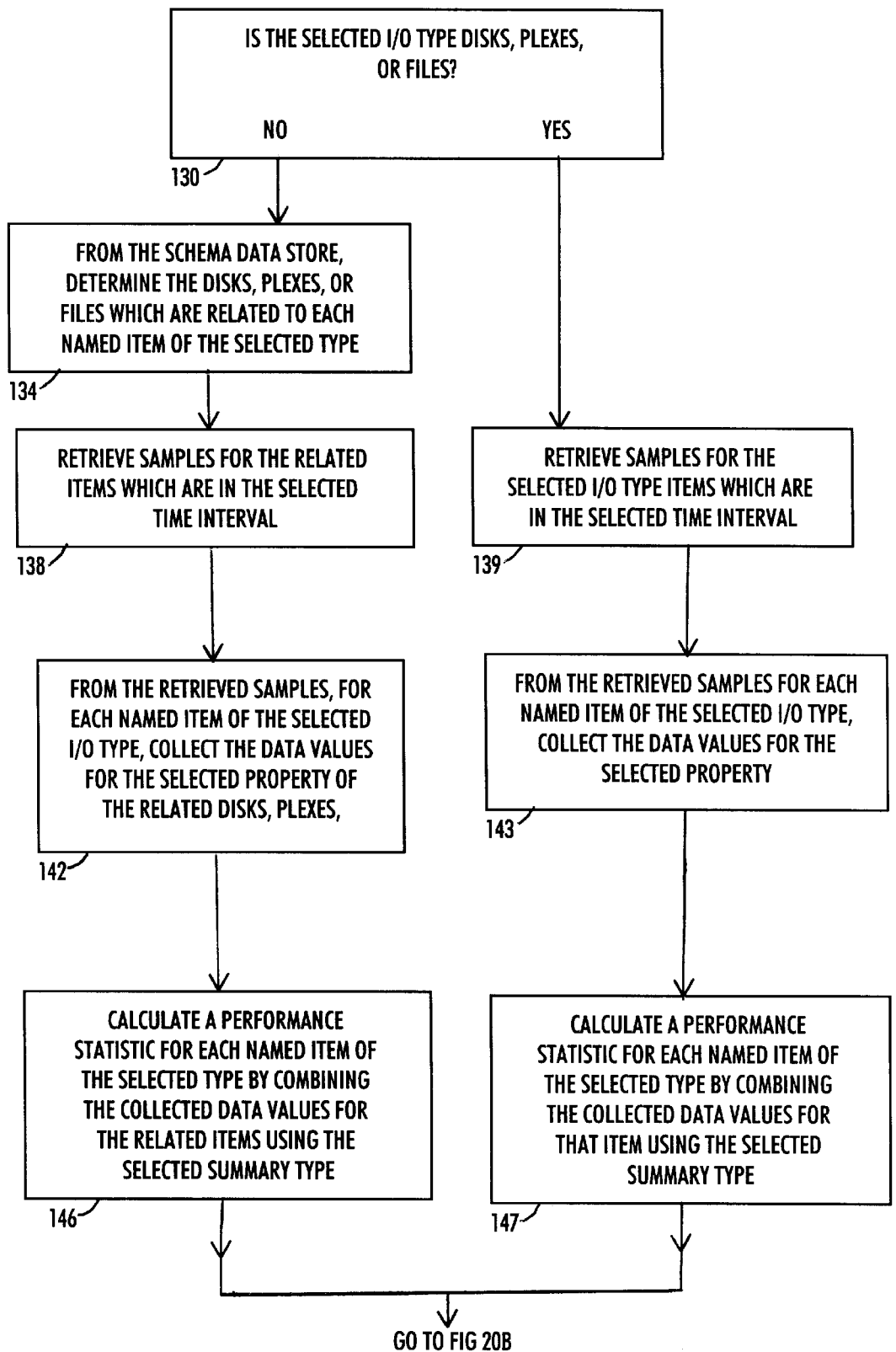
FIGS. 20A and 20B are a flow diagram showing how selected sample data is processed for display.
Figure 20B:
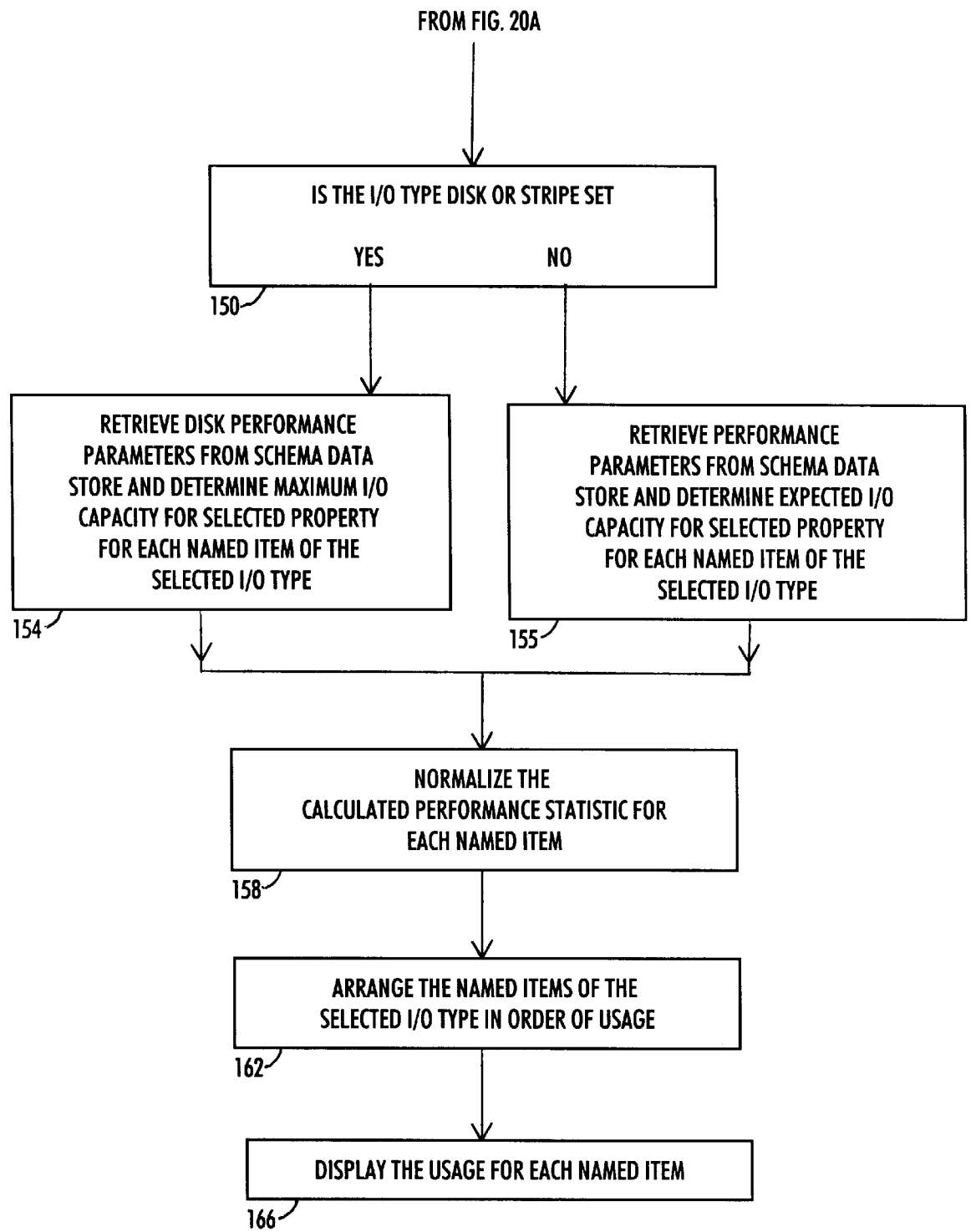

FIGS. 20A and 20B show the steps that would be carried out in response to the calculate button to produce the display of FIG. 14. First, the system determines whether the selected I/O type is disks, plexes, or files, block 130. For these I/O types, the sample data is directly available from the usage data store 58, and the system can proceed to retrieve the data samples for the time interval chosen by the user, block 139. For stripe sets, volumes and tablespaces, the system must go to the schema data store 60 to determine the related disks, plexes, or files, block 134, after which the data samples are retrieved from the usage store 58 for the related items occurring in selected time interval, block 138.

Next, for each named item of the selected I/O type, the data samples are collected, blocks 146 and 147, and the individual samples for each name are combined using the selected mathematical summary to create a single statistical value for each name, block 146.

Next, the data must be normalized. Normalization is done to take into account the fact that for a particular I/O type the different named items may have different I/O capacities. In order to accurately display the relative hotness for many items, the activity of that item should be displayed normalized based on the relative performance of the item.

For example, the disk array 26 may have disks of varying performance capabilities. If for example, the disk array has half of its disks which have a maximum capability of 60 I/O operations per second and half with a maximum of 80 I/O operations per second, the calculated statistical values for each of those two disks is normalized by dividing by the respective I/O capacity. The disk performance parameters used for performing this normalization are stored in the schema data store, as discussed above in connection with 5.

Stripe set normalization is performed similarly. The I/O performance parameters for the disks which make up each stripe set are added together to provide the normalization factor for that stripe set.

Normalization for volumes, plexes, files, and tablespaces is done differently. If, for example, there are 10 volumes stored on one stripe, each individual volume can perform at the level set by the disks on which it is striped, but obviously all 10 volumes cannot perform this well if they are being accessed at the same time. One method for normalizing I/O types other than disk and stripe sets is to normalize them relative to the performance of disk stripe on which they are stored.

Alternatively, these I/O types can be normalized with respect to the expected activity of the particular item in question. The level of expected activity can be determined by prediction based on the database design and expected usage, or it can be determined by using the actual usage as reflected by the data samples gathered by the present invention. The expected activity for files and plexes would be stored as usage parameters in the schema data file as discussed above in connection with FIGS. 6 and 7.

FIG. 20B illustrates normalization using the second method described above where non-disk-related I/O types are normalized based on expected I/O operations. Thus, the system first checks to see if the I/O type is disks or stripe sets, block 150. If so, then the disk performance parameters are retrieved to normalize the statistics for each item, block 154. If not, then the expected I/O operations are retrieved from the schema data store 60, block 155. Next the calculated values for each named item, as determined in blocks 146 and 147, are normalized, block 158, and the data is arranged in order of hotness, block 162. Finally the normalized data is displayed on the monitor, block 166.

Figure 18:
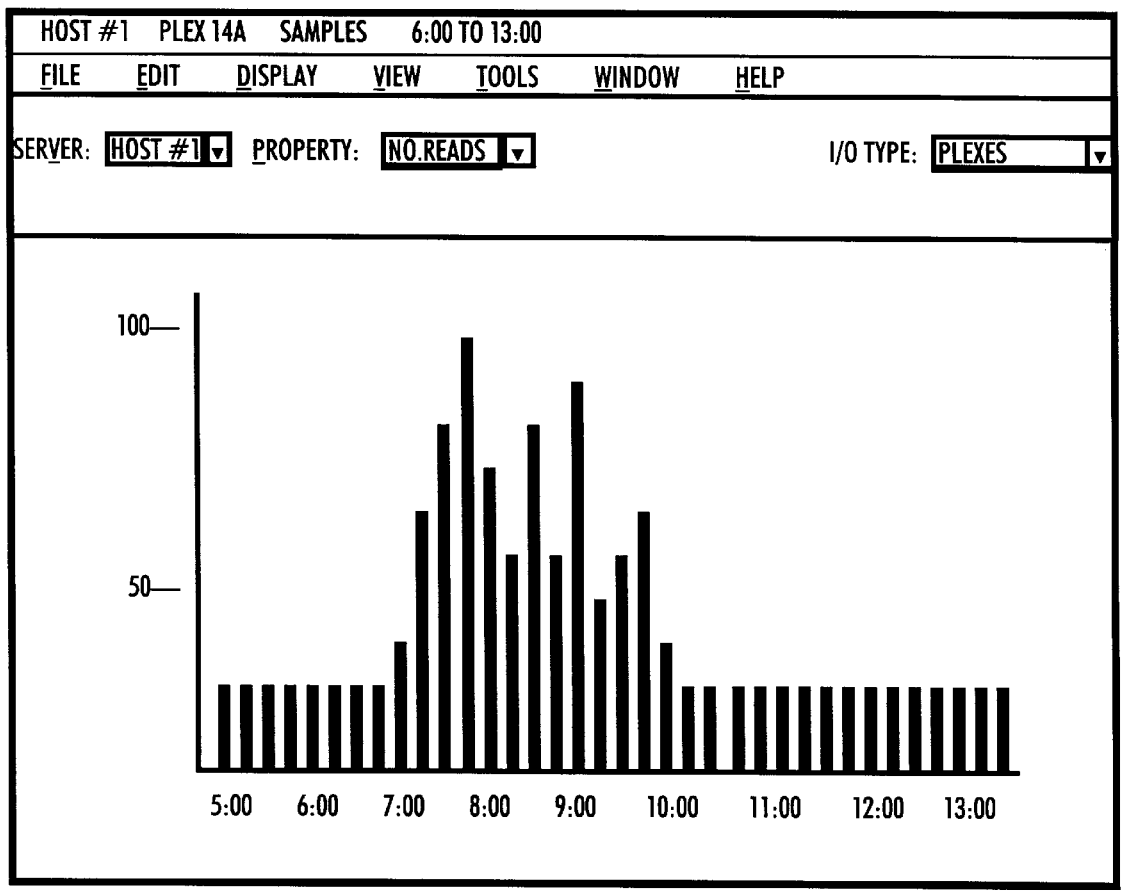
FIG. 18 shows a display of sample data for the busiest plex in FIG. 17.

After one set of data is displayed, a user can display usage data related to any of the displayed items. Referring again to FIG. 14, further analysis may be carried out for any of the stripe sets shown. By right-clicking on bar 83, a menu 84 may be brought up which allows a user to select the disk, file volume, plex, or tablespace usage associated with stripe 14 for display. A "samples" option in menu 84 is also available and may be selected to view the actual sample data plotted against time, as shown by FIGS. 16 and 18 and discussed in more detail below.

Figure 15:
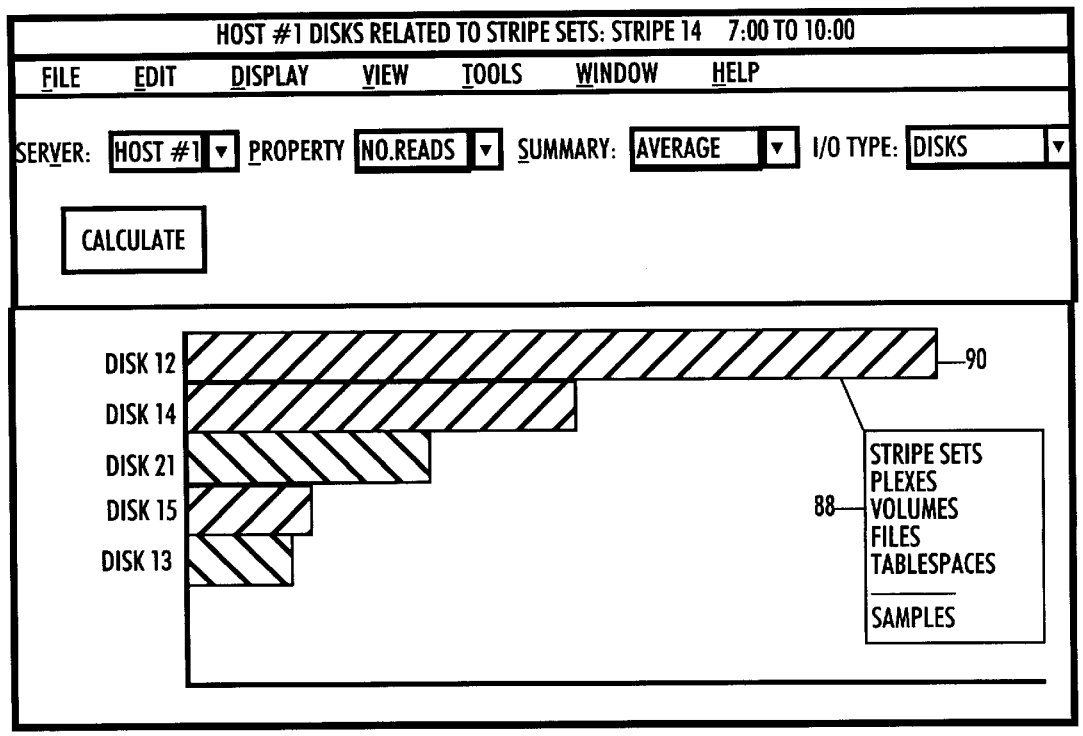
FIG. 15 shows how the invention would be used to display disk data activity for one of the stripe sets of FIG. 14.

Assume that a user selected stripe 14 in FIG. 14 and selected the disks option from menu 84 in order to examine the performance for the disks associated with stripe set 14. The result of this would be a display such as that shown in FIG. 15. FIG. 15 shows a bar graph similar in form to FIG. 14 displaying the number of reads for the three disks that stripe 14 is spread across. The procedure for generating the display of FIG. 15 is the same as shown in FIGS. 20A and 20B, with the additional step before blocks 138 or 139 of further narrowing the subset of retrieved samples by selecting those items that are related to the selected I/O named item, which is stripe set 14 the example of FIG. 15.

Figure 16:
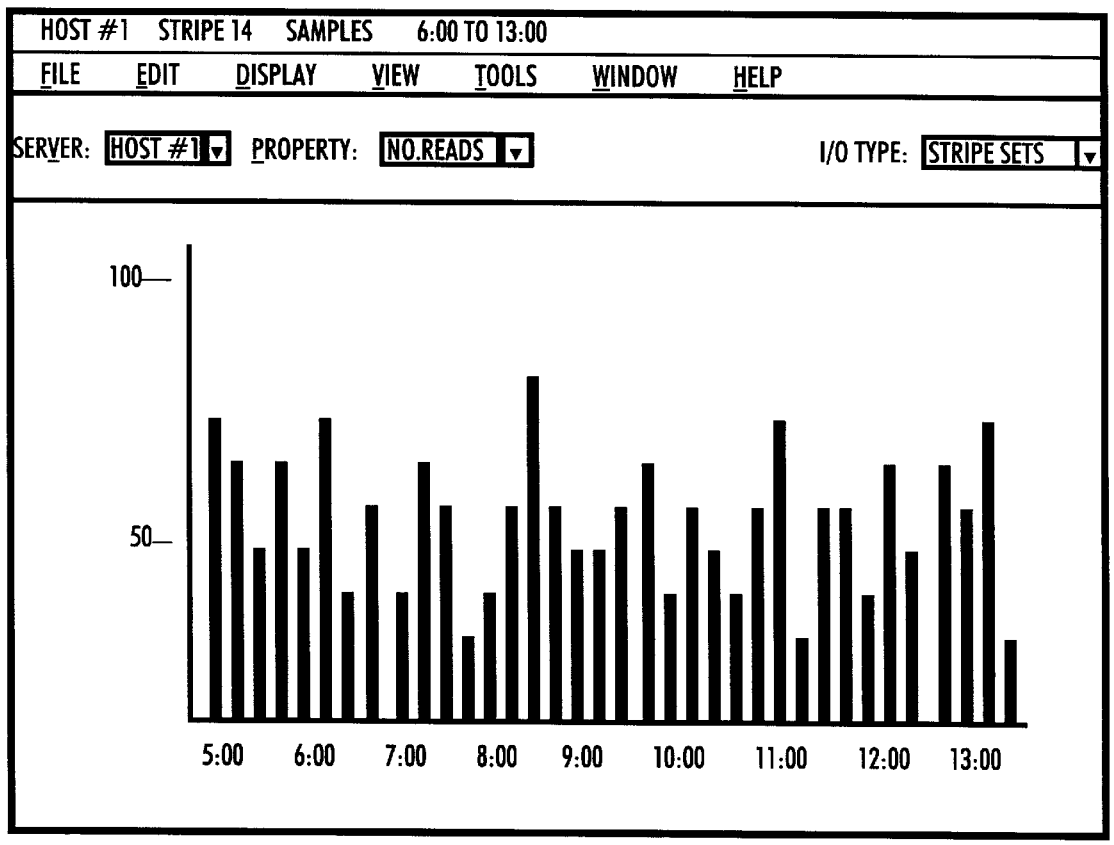
FIG. 16 show a display of actual sample data for one of the stripe sets in FIG. 14.

Additionally, if, in FIG. 14, a user selected the samples option, a display similar to that shown in FIG. 16 would be displayed, showing the values of each stored sample in the selected time frame.

This procedure can be reiterated to determine the ultimate source or cause of a hot item. For example, right clicking on bar 90 in FIG. 15 brings up a menu 86 similar to menu 84 which allows a user to do an analysis of the stripe sets, plexes, volumes, files, or tablespaces associated with disk 12. This procedure can be repeated until the source of the problem is tracked down.

FIGS. 14 and 15 show only a few bars representing different stripesets and disks. A VLDB would typically contain many times this number. The windows of FIGS. 14 and 15 would be typically programmed to include other conventional features, such as the ability to zoom in and out to show different numbers of the selected item, and provision for scroll bars to move the displayed part of a large window up and down. Programming these functions is a normal part of designing such windows and is easily done by one skilled in the art. Other options may added to the interface without departing from the teachings of the present invention.

The following example illustrates how the present invention may be used in a realistic situation. In this example, assume that an on-line transactional processing database is being used to provide order entry support for customer service personnel taking orders, and that the present invention has been used to collect samples for the database every fifteen minutes. One typical problem that might arise would be a sudden degradation of performance of the order entry application, and for this example, assume that the degradation started at 7:00 am and lasted for a period of about three hours. This type of problem typically results in an increase in the waiting period for telephone customers, resulting in abandoned calls and lost sales, so that correction of the problem quickly is of utmost importance.

As should be apparent from the above description of the invention, a variety of strategies might be useful in tracking down such a problem. The illustration of one particular route to a solution should not be taken as excluding other methods of using the invention.

To resolve the above-described problem, a DBA using the present invention might first set the Select Interval window 78 in FIG. 13 to select a time period of 7:00 am to 10:00 am on the date in question. Next, the DBA might select to analyze the stripeset activity. FIG. 14 shows the display that would result. From FIG. 14, it is apparent that stripeset 14 is the busiest or "hottest" stripeset, The question is now what is causing this stripe set to be so hot.

The DBA might next choose stripe 14 and select samples, to show the activity for stripe set 14 over time. In FIG. 16, the DBA has chosen to display I/O transactions from 5:00 am to 1:00 PM. From this display it appears that the source of the problem is not an abnormally high number of I/O operations during the 7:00–10:00 time period, which would be the first cause that a DBA might assume in attempting to fix the problem without the facilities provided by the present invention.

After looking at the data of FIG. 16, the DBA might next choose to look at individual disk activity within stripe set 14. this would produce the display of FIG. 15. From FIG. 15, it would be clear that disk 12 is very hot and that something stored on this disk is slowing the performance of the stripe set. The problem could be that a single unstriped plex or volume is installed there, perhaps because there was free space available on that disk when it was installed. Alternatively, the problem might be multiple plexes interfering at a point of intersection on disk 12.

Figure 17:
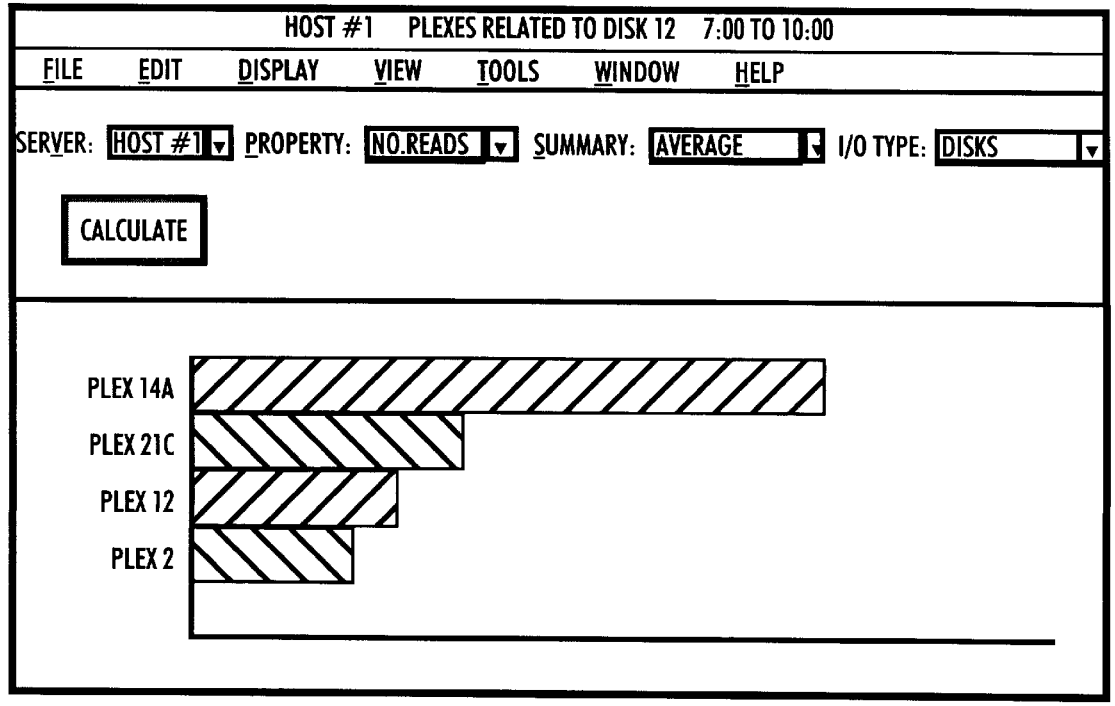
FIG. 17 shows a display of plex activity for the busiest disk in FIG. 15.

Accordingly, the DBA might next choose to look into the plexes stored on the disk. Selecting to examine the plexes associated with disk 12 for analysis would result in the display of FIG. 17. From this display, it is appears that high activity on plex 14A is causing the slowdown. The DBA might then choose to look at the samples for plex 14A I/O over the time period from 5:00 am to 1:00 PM, resulting in the display of FIG. 18. FIG. 18 shows that there is spike of abnormally high activity on plex 14A during the time period of poor performance, indicating that the DBA is homing in on the problem.

This process would continue with the DBA next looking at the individual tablespaces and files stored in plex 14A until the database objects causing the problem are identified. At this point, the lightly used resources of the database have also been identified, facilitating the replacement of the problem objects. It should be appreciated that this is only one possible scenario and problem from a myriad of possibilities. The present invention allows a DBA to quickly and efficiently locate the source of a particular problem without doing anything that would in and of itself affect the database performance.

Additionally, the present invention can be used to improve placement, even when there is no apparent problem, by analyzing the data collected and stored. This data is analyzed by the process shown in the flow chart of FIG. 19.

Figure 19:
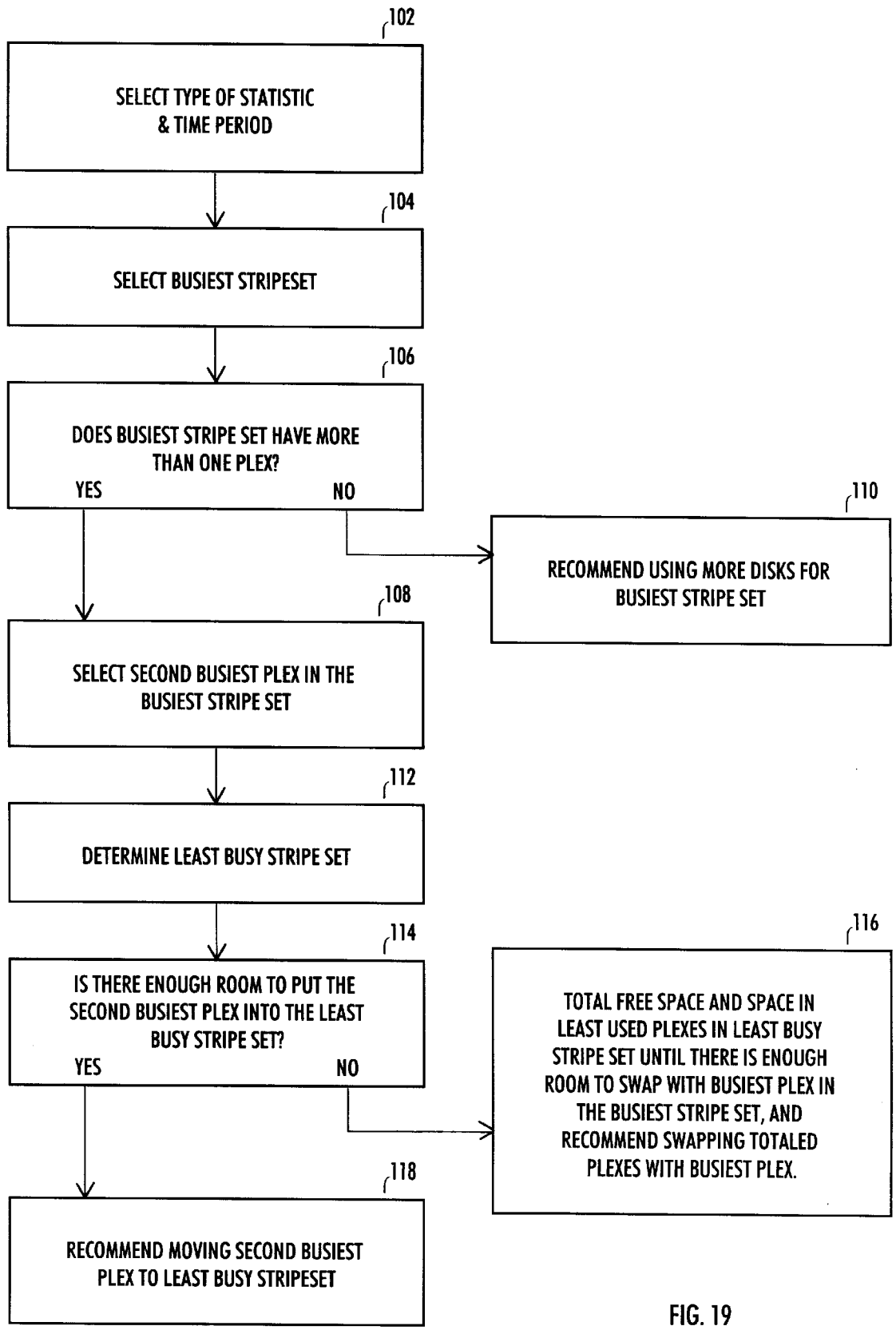
FIG. 19 is a flow diagram of a procedure that can be used with the present invention to make recommendations for improving placement in a VLDB.

In FIG. 19, the user would first select the relevant time period and the type of property to be used, as indicated by block 102 in FIG. 19. As described above, different properties are more or less important depending on the particular application of the database being analyzed. For example, in on-line transactional processing, the number of reads and the number or writes are the most important statistics, and a weighted I/O property with 50% read and 50% writes would be selected. In decision support systems, the number of reads would be the most relevant statistical. In data warehousing, the most important statistic is kilobytes read per second.

Once the user has selected a time period and property, the present invention carries out the remainder of the procedure shown in FIG. 19 to recommend placement actions to take out. These procedures may be done on the PC 52, shown in FIG. 4, or by another processor which has access to the usage and schema data stores 58 and 60. First, the system determines the busiest stripe set, block 104. Next, the system determines whether the busiest stripe set has more that one plex stored in it, block 106. If only a single logical file is stored on the stripeset, the system will recommend using more disks for the stripeset, block 110. If more than one logical file is stored on the stripe set, the system determines the second busiest plex in the stripe set, block 108. This plex will be referred to below as the plex to be moved. Next the least busy stripe set is determined, block 112. The free space in the least busy stripe set is then checked to see whether there is enough room for the plex to be moved to the least busy stripe set, block 114. If there is room, that recommendation is made, block 118. If not, the least busy stripe set is analyzed by totaling (1) the free space, and (2) the space occupied by least busy plexes, until the total provides sufficient space to hold the plex to be moved, block 116, and that recommendation is made.

Following the above procedure, and assuming that a DBA has changed the placement in accordance with the recommendation, the database system is monitored during normal operation for a period of time so that new samples can be gathered with the new placement in operation. Then the analysis of FIG. 19 would be carried out again.

There has been described a new and useful method and apparatus for analyzing and optimizing placement in very large database systems. While the operation and advantages of the present invention has been described with reference to the exemplary embodiments described above, it should be appreciated that modifications to these embodiments will be made by those of ordinary skill in the art in applying the teachings of the invention to different situations and applications. Accordingly, the present invention should not be limited by the embodiments described above, but rather the scope of the invention should be interpreted in accordance with the following claims.

What is claimed is:

1. A method for analyzing disk performance in a database system of the type which includes (a) database program means for responding to external queries for data input and output from users of the database system, (b) a data storage system for storing data used by the database system, on a plurality of individual disk drives, and (c) file system means, responsive to database file I/O requests from the database program to store and retrieve database files, for sending file system I/O commands to the data storage system to store and retrieve the database files on the data storage system arranged as a plurality of logical disks, at least some of the logical disks being striped across a plurality of the individual disk drives, the method including the steps of:

defining a series of successive sampling periods during which sample data reflecting the performance of the database system is to be taken;

monitoring the database program means to collect data representative of database file I/O requests that occur during each sampling period and storing the collected data as a plurality of first data samples, each first data sample including the time of the data sample, the name of the associated database file, and a plurality of parameters of different types representative of the speed of response of the file system means to the database file I/O request;

monitoring the file system means to collect data representative of file system I/O commands that occur during each sampling period and storing the collected data as a plurality of second data samples, each second data sample including the time of the data sample, the name of the associated logical disk, and a plurality of parameters of different types representative of the speed of response of the data storage system to the file system I/O request;

monitoring the data storage system to collect data representative of the speed of response of each individual disk drive as data is stored and retrieved during each sampling period and storing the collected data as a plurality of third data samples, each third data sample including the time of the data sample, the name of the associated disk drive, and a plurality of parameters of different types representative of the speed of response of the disk drive as data is stored on and retrieved from the disk drive;

providing a display representative of database performance as reflected by the stored statistics, including the steps of:

designating a display time interval;

selecting one I/O type from among a group comprising database files, logical disks, and disk drives;

selecting one of the types of stored parameters for the selected I/O type;

selecting, from the stored data samples, a subset of samples for the selected I/O type that fall within the designated interval, so that the selected subset of samples will include a plurality of samples for either database files, logical disks, or disk drives, depending on the I/O type selected;

grouping the selected data samples into a plurality of groups so that each group includes data samples having the same name;

for each of said groups, mathematically combining the selected parameter in each of the data samples of the group to provide a single statistical parameter associated with the name of the groups data samples; and displaying the statistical parameters along with the associated name for each of the names present in the selected subset.

2. The method of claim 1 wherein further including the steps of:

selecting one of the names in the displayed statistical parameters;

selecting a second I/O type from among the group comprising database files, logical files, and disk drives, but excluding the I/O type of the displayed parameters;

selecting, from the stored data samples, a second subset of samples for the selected I/O type that fall within the designated interval and that are related to the selected item;

mathematically processing the parameters for each set of samples with the same name in the second group of selected samples to provide a single statistical parameter representative of performance associated with the named item; and displaying the statistical parameters for each of the items present in the selected subset.

3. The method of claim 1 further including the steps of:

providing a schema data store which includes the name of each stripe set and the names of all disk drives that are associated with each stripe set;

wherein the groups of I/O types from which the first and second I/O types are select includes stripe sets;

wherein, when stripe set is the I/O type selected, the step of selecting a subset of samples includes the step of selecting, from the stored third data samples, a subset of samples that fall within the designated interval, so that the selected subset of samples will include a plurality of samples for disk drives; and wherein the step of grouping includes grouping the selected subset of third data samples so that each group includes data samples from disks associated with a name of a stripe set.

4. The method of claim 1 wherein at least some of the logical disks are mirrored disks in which identical information is stored on a plurality of separate logical drives, the plurality of separate logical drive making up a volume and further including the steps of:

providing a schema data store which includes a name for each volume and the names of the logical disks which make up the volume;

wherein the groups of I/O types from which the first and second I/O types are select includes volumes;

wherein, when volumes is the I/O type selected, the step of selecting a subset of samples includes the step of selecting, from the stored second data samples, a subset of samples that fall within the designated interval, so that the selected subset of samples will include a plurality of samples for logical drives; and wherein the step of grouping includes grouping the selected subset of second data samples so that each group includes data samples from logical disks associated with a name of a volume.

5. The method of claim 1 wherein the database system is an Oracle database which includes tablespaces, each of which has database files associated therewith and further including the steps of:

providing a data store which includes a name for each tablespace and the names of the database files associated with the tablespace;

wherein the groups of I/O types from which the first and second I/O types are select includes tablespaces;

wherein, when tablespaces is the I/O type selected, the step of selecting a subset of samples includes the step of selecting, from the stored first data samples, a subset of samples that fall within the designated interval, so that the selected subset of samples will include a plurality of samples for database files; and wherein the step of grouping includes grouping the selected subset of first data samples so that each group includes data samples from database files associated with a name of a tablespace.

6. The method of claim 1 wherein the step of mathematically combining includes the step of providing a choice of one from among a plurality of statistical methods of analysis to provide said single statistical parameter; and wherein the step of processing includes the step of combining the parameters associated with each named item using the chosen method to provide said single statistical parameter for each named item.

7. The method of claim 6 wherein the step of processing a choice includes the step of providing a choice between calculating minimum, maximum, average, mean, or R.M.S. values for the samples associated with each name.

8. The method of claim 6 wherein the choice of statistical methods includes a weighted I/O method and further includes the step of, when said weighted I/O method is chosen, assigning a relative proportional value to each of the parameters associated with the samples of the selected I/O type, wherein said relative percentage can be zero percent, and wherein the step of mathematically combining includes combining the parameters associated with the each sample in each group in accordance with the respective assigned proportional values to provide said single statistical parameter.

9. The method of claim 6 wherein the step of mathematically combining includes the steps of:

providing a schema data store which includes for each named disk drive a speed value representing the speed of I/O performance for that disk drive relative to the other disk drives; and wherein, when the selected I/O type is disk drives, the step of mathematically combining includes the step of normalizing the set of each data samples by, for each named drive, dividing the result of said combining step by the speed value associated with that drive.

10. The method of claim 1 wherein the plurality of parameters stored in each of the first, second, and third data samples representative of the speed of response of the associated I/O type includes, for each sampling period, the number of kilo-bytes written, the number of kilobytes read, the number of read operations, and the number of write operations.

11. The method of claim 10 wherein the plurality of parameters stored in each of the third data sample includes queue length and service time.

12. The method of claim 1 wherein the step of displaying includes the step of displaying a graphical representation of each statistical parameter.

13. The method of claim 1 wherein the step of displaying includes the step of displaying each statistical parameter as a bar of a bar graph, and wherein the bars are arranged in order of the values of the statistical parameters.

14. A method for speeding up disk performance by improving placement in a database system of the type which includes (a) database program means for responding to external queries for data input and output from users of the database system, (b) a data storage system for storing data used by the database system, on a plurality of individual disk drives, and (c) file system means, responsive to database file I/O requests from the database program to store and retrieve database files, for sending file system I/O commands to the data storage system to store and retrieve the database files on the data storage system arranged as a plurality of logical disks, at least some of the logical disks being striped across a plurality of the individual disk drives, the method including the steps of:

defining a series of successive sampling periods during which sample data reflecting the performance of the database system is to be taken;

monitoring the file system means to collect data representative of file system I/O commands that occur during each sampling period and storing the collected data as a plurality of first data samples, each second data sample including the time of the data sample, the name of the associated logical disk, and a plurality of parameters of different types representative of the speed of response of the data storage system to the file system I/O request;

monitoring the data storage system to collect data representative of the speed of response of each individual disk drive as data is stored and retrieved during each sampling period and storing the collected data as a plurality of second data samples, each data sample including the time of the data sample, the name of the associated disk drive, and a plurality of parameters of different types representative of the speed of response of the disk drive as data is stored on and retrieved from the disk drive;

providing a schema data store which includes (1) the name of each stripe set and the names of all disk drives that are associated with that stripe set, and (2) the name of each logical drive and the names of all disk drives that are associated with that logical drive;

designating a time interval during which the database performance is to be analyzed for improvement;

selecting one of the types of parameters stored in each third data set;

selecting, from the stored data samples, a subset that includes all first data samples that fall within the designated interval, so that the selected subset of samples will include a plurality of samples for disk drives that occurred in the designated interval;

grouping the selected data samples into a plurality of first groups so that each group includes data samples associated with stripe a named set;

for each of first said groups, mathematically combining the selected parameter in each of the data samples of the group to provide a set of first statistical parameters representative of I/O activity associated with each stripe set;

determining the busiest stripe set which is the stripe set with the highest I/O activity, as reflected by the statistical parameters;

determining if the selected stripe set includes more than one logical drive, and if not, recommending that more individual disk drives be used to store the selected stripeset, otherwise performing the following steps;

determining the logical disks on which the selected stripe set is stored;

selecting, from the stored data samples, a second subset that includes all second data samples that fall within the designated interval and that are associated with each logical disk that is part of the selected stripe set, so that the second subset of samples will include a plurality of samples for logical disks that compose the selected stripe set and which occurred in the designated interval;

grouping the second subset of selected data samples into a plurality of second groups so that each group includes data samples associated with a named logical disk;

for each of said second groups, mathematically combining the selected parameter in each of the data samples of the group to provide a set of second statistical parameters representative of I/O activity associated with each named logical disk;

determining second busiest logical disk which is the logical disk with the second highest I/O activity, as reflected by said first statistical parameters;

determining a least busy stripe set which is the stripe set with the lowest I/O activity, as reflected by the statistical parameters;

determining if there is enough room on the disk drives on which the least busy stripe set is stored to move the second busiest logical disk from the busiest stripe set to the least busy stripe set, and if so, recommending that such move be made.

* * * * *